United States Patent [19]

Huguet et al.

[11] 3,912,747
[45] Oct. 14, 1975

[54] DERIVATIVES OF 2-HYDROXYMETHYL-1,3,4-OXADIAZOLE

[75] Inventors: Gérard J. Huguet; Claude P. Fauran; Colette A. Douzon; Guy M. Raynaud, all of Paris; Janine M. Thomas, Neuilly sur Seine, all of France

[73] Assignee: Delalande S.A., Courbevoie, France

[22] Filed: Jan. 25, 1974

[21] Appl. No.: 436,694

[30] Foreign Application Priority Data
Feb. 1, 1973 France .............................. 73.03593

[52] U.S. Cl. .......... 260/307 G; 260/453 R; 424/272
[51] Int. Cl.² ....................................... C07D 271/10
[58] Field of Search ................................ 260/307 G

[56] References Cited
UNITED STATES PATENTS

| | | | |
|---|---|---|---|
| 3,065,238 | 11/1962 | Weidinger et al. | 260/296 |
| 3,502,668 | 3/1970 | Palazzo et al. | 260/247.5 |
| 3,718,452 | 2/1973 | Dahle et al. | 71/92 |

OTHER PUBLICATIONS
Wagner et al., "Synthetic Organic Chemistry," Wiley & Sons, Inc., New York, (1953), p. 645.
Morrison et al., "Organic Chemistry," Allyn & Bacon, Inc., Boston, (1959), pp. 482–484.

Primary Examiner—Raymond V. Rush
Attorney, Agent, or Firm—Woodhams, Blanchard and Flynn

[57] ABSTRACT

Compounds of the formula

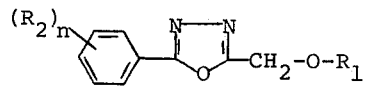

wherein $R_1$ is hydrogen, aminocarbonyl or aminocarbonyl N-substituted by alkyl having up to 4 carbon atoms,
$R_2$ is halogen, alkoxy having up to 4 carbon atoms, alkyl having up to 4 carbon atoms, or trifluoromethyl
$n$ is 0, 1, 2 or 3 are prepared by reacting ethyl hydroxyacetimidate hydrochloride with phenylhydrazide or $(R_2)_n$—substituted phenylhydrazide. When $R_1$ is other than hydrogen, that reaction product is reacting with an alkyl isocyanate, or reacted with phenylchloroformate followed by reaction with ammonia. The compounds possess analgesic, antiinflammatory, anticonvulsivant, tranquilizing, myorelaxant, antidepressive, vasodilatatory, diuretic, anti-ulcerous, antiarythmic, antiserotoninic, spasmolytic, hypotensive, antibronchocontrictive, anticholinergic and antiemetic properties.

19 Claims, No Drawings

DERIVATIVES OF 2-HYDROXYMETHYL-1,3,4-OXADIAZOLE

The present invention relates to novel derivatives of 2-hydroxymethyl-1,3,4-oxadiazole, their process of preparation and their therapeutic application.

The novel derivatives according to the invention correspond to the general formula I:

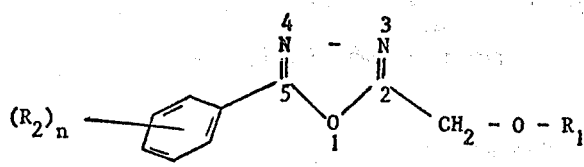

(I)

in which:
$R_1$ represents a hydrogen atom or an aminocarbonyl radical optionally N-substituted by an alkyl chain, R, containing up to 4 carbon atoms;
$R_2$ represents a halogen atom, an alkoxy or alkyl radical containing up to 4 carbon atoms, or a trifluoromethyl radical; and
$n$ is 0, 1, 2 or 3.

The process according to the invention comprises condensing in an anhydrous alcoholic medium and with boiling, ethyl hydroxyacetimidate hydrochloride of formula II.

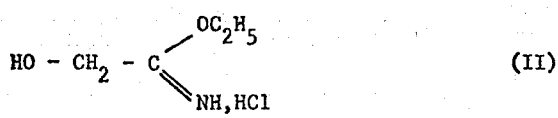

(II)

with a phenylhydrazide of formula III:

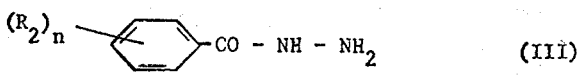

(III)

in which $R_2$ and n have the same significance as in formula (I) and, possibly, by reacting the resultant compound of formula IV:

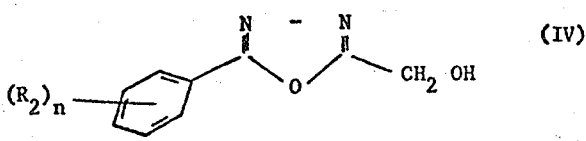

(IV)

with a compound selected from:
an alkyl isocyanate of formula V:

$$R - N = C = O \qquad (V)$$

where R has the same significance as in formula (I); or phenyl chloroformate of formula VI

(VI)

this latter reaction producing the compound of formula VII:

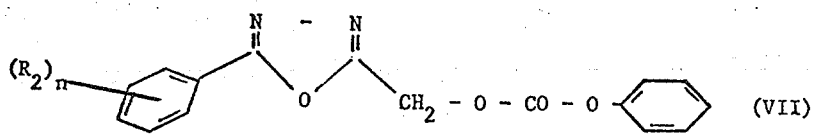

(VII)

which is subsequently treated with liquid ammonia.

The reaction between the compounds of formulas (IV) and (V) is carried out under pressure and at a temperature between 100° and 120°C.

The following preparations are given by way of examples to illustrate the invention.

EXAMPLE 1

2-Hydroxymethyl-5-phenyl-1,3,4-oxadiazole (Code No. 71558)

68 g (0.5 mol) of phenylhydrazide dissolved in 600 c.c. of anhydrous ethanol (distilled under sodium) are rapidly introduced at ambient temperature and with good agitation, to a solution of 84 g (0.6 mol) of ethyl hydroxyacetimidate hydrochloride in 600 c.c. of anhydrous ethanol. The mixture is kept at ordinary temperature for 15 minutes, and is then heated for 1 hour with boiling.

The ammonium chloride formed is dried and the filtrate is concentrated under reduced pressure by distilling off two-thirds of the alcohol utilised. The product crystallises, is dried, washed with water and then with isopropyl ether. It is purified by recrystallisation from absolute alcohol.

Melting point = 127°C
Yield = 89%
Empirical formula = $C_9H_8N_2O_2$

Elementary analysis:

|  | C | H | N |
|---|---|---|---|
| Calculated % | 61.36 | 4.58 | 15.90 |
| Found % | 61.31 | 4.75 | 16.04 |

EXAMPLE 2

Aminocarbonyloxy-2-methyl-5-phenyl-1,3,4-oxadiazole (Code No. 7209)

The phenylcarbonate of the compound of Code No. 71558 prepared by Example 1, is prepared in a first stage. For 16 16g (0.1 mol) of phenylchloroformate is introduced into a solution, cooled to 5°C, of 18 g (0.1 mol) of said compound of Code No. 71558 in 200 c.c. of dry pyridine.

The preparation is maintained at ambient temperature for 12 hours and then the pyridine is evaporated under vacuum. The product obtained of formula (VII) ($n = 0$), is dissolved 200 200c.c. of ethyl acetate and the solution is washed with 2N hydrochloric acid, and then with a solution of sodium bicarbonate.

After evaporation of solvent, the product is sufficiently pure.

Melting point = 94°C
Yield = 95%

The carbamate is obtained by adding 30 g (0.1 mol) of the compound of formula (VII) prepared above to 200 c.c. of liquid ammonia. The compound rapidly dissolves therein. The preparation is then maintained for 5 hours under ammonia reflux. After evaporation of the latter, the product is placed in suspension in 250 c.c. of dried isopropyl ether. It is purified by recrystallisation from 250 c.c. of 96° alcohol.

Melting point = 149°C
Yield = 90%
Empirical formula = $C_{10}H_9N_3O_3$

Elementary analysis:

|  | C | H | N |
|---|---|---|---|
| Calculated % | 54.79 | 4.14 | 19.17 |
| Found % | 55.02 | 4.29 | 19.14 |

EXAMPLE 3

2-Methylaminocarbonyloxymethyl-5-phenyl-1,3,4-oxadiazole (Code No. 71574)

A solution in 250 c.c. of anhydrous benzene of 18 g (0.1 mol) of the compound of code No. 71558, prepared by example 1, and 9 g (0.15 mol) of methyl isocyanate is heated for 5 hours at 100°C in an autoclave.

After evaporation of the solvent, the product obtained is recrystallised from 100 c.c. of isopropyl alcohol.

Melting point = 114°C
Yield = 86%
Empirical formula = $C_{11}H_{11}N_3O_3$

Elementary analysis:

|  | C | H | N |
|---|---|---|---|
| Calculated % | 56.65 | 4.75 | 18.02 |
| Found % | 56.56 | 4.84 | 17.85 |

The compounds listed in the following Tables I, II and III, have been prepared according to the method of operation described in Examples 1, 2 and 3 respectively.

TABLE I

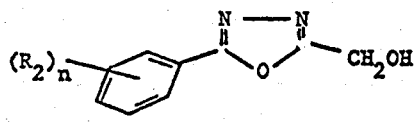

| Code No. | $(R_2)_n$ | Empirical Formula | Molecular Weight | Melting Point (°C) | Yield (%) | Elementary analysis Calculated (%) C | H | N | Found (%) C | H | N |
|---|---|---|---|---|---|---|---|---|---|---|---|
| 72460 | H₃C- (para) | $C_{10}H_{10}N_2O_2$ | 190.20 | 82 | 78 | 63.15 | 5.30 | 14.73 | 63.23 | 5.41 | 14.53 |
| 72415 | H₃C- (para) | $C_{10}H_{10}N_2O_2$ | 190.20 | 108 | 64 | 63.15 | 5.30 | 14.73 | 63.12 | 5.46 | 14.93 |
| 72349 | Cl- | $C_9H_7ClN_2O_2$ | 210.62 | 127 | 70 | 51.32 | 3.35 | 13.30 | 51.44 | 3.44 | 13.39 |
| 72130 | F- | $C_9H_7FN_2O_2$ | 194.16 | 118 | 60 | 55.67 | 3.63 | 14.43 | 55.88 | 3.87 | 14.23 |
| 72329 | F- | $C_9H_7FN_2O_2$ | 194.16 | 110 | 60 | 55.67 | 3.63 | 14.43 | 45.88 | 3.66 | 14.46 |
| 72293 | F₃C- | $C_{10}H_7F_3N_2O_2$ | 244.17 | 126 | 81 | 49.19 | 2.89 | 11.47 | 48.99 | 2.91 | 11.51 |
| 72132 | Cl,Cl- | $C_9H_6Cl_2N_2O_2$ | 245.07 | 184 | 91 | 44.11 | 2.47 | 11.43 | 44.02 | 2.36 | 11.26 |
| 72115 | H₃CO- | $C_{10}H_{10}N_2O_3$ | 206.20 | 146 | 87.5 | 58.25 | 4.89 | 13.59 | 58.23 | 5.07 | 13.50 |
| 72357 | H₃CO, H₃CO- | $C_{11}H_{12}N_2O_4$ | 236.22 | 120 | 60 | 55.93 | 5.12 | 11.86 | 56.10 | 5.21 | 11.86 |
| 72403 | H₃CO, H₃CO, H₃CO- | $C_{12}H_{14}N_2O_5$ | 266.25 | 160 | 60 | 54.13 | 5.30 | 10.52 | 53.93 | 5.28 | 10.60 |
| 72845 | -Cl (ortho) | $C_9H_7ClN_2O_2$ | 210.62 | 105 | 57 | 51.32 | 3.35 | 13.30 | 51.60 | 3.37 | 13.45 |
| 72846 | -OCH₃ (ortho) | $C_{10}H_{10}N_2O_3$ | 206.20 | 86 | 50 | 58.25 | 4.89 | 13.59 | 58.08 | 4.91 | 13.61 |

TABLE II

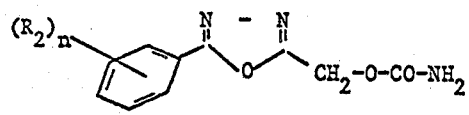

| Code No. | (R₂)ₙ― | Empirical Formula | Molecular Weight | Melting point (°C) | Yield (%) | Calculated (%) C | H | N | Found (%) C | H | N |
|---|---|---|---|---|---|---|---|---|---|---|---|
| 72516 | H₃C– (o) phenyl | $C_{11}H_{11}N_3O_3$ | 233.22 | 130 | 52+ | 56.65 | 4.75 | 18.02 | 56.48 | 4.55 | 11.87 |
| 72468 | H₃C– (p) phenyl | $C_{11}H_{11}N_3O_3$ | 233.22 | 195 | 81 | 56.65 | 4.75 | 18.02 | 56.85 | 4.81 | 18.14 |
| 72467 | Cl– (p) phenyl | $C_{10}H_8ClN_3O_3$ | 253.64 | 196 | 78 | 47.35 | 3.18 | 16.57 | 47.29 | 3.25 | 16.49 |
| 72445 | F– (o) phenyl | $C_{10}H_8FN_3O_3$ | 237.18 | 149 | 33+ | 50.63 | 3.40 | 17.72 | 50.83 | 3.46 | 17.65 |
| 72527 | F– (p) phenyl | $C_{10}H_8FN_3O_3$ | 237.19 | 155 | 84 | 50.63 | 3.40 | 17.72 | 50.49 | 3.37 | 17.51 |
| 730072 | Cl (o) phenyl | $C_{10}H_8ClN_3O_3$ | 253.65 | 150 | 69+ | 47.35 | 3.18 | 16.57 | 47.22 | 3.13 | 16.50 |
| 730086 | OCH₃ (o) phenyl | $C_{11}H_{11}N_3O_4$ | 249.22 | 198 | 63+ | 53.01 | 4.45 | 16.86 | 53.20 | 4.30 | 16.70 |
| 72410 | F₃C– (o) phenyl | $C_{11}H_8F_3N_3O_3$ | 287.20 | 144 | 80 | 46.00 | 2.81 | 14.63 | 46.05 | 2.83 | 14.44 |
| 72220 | Cl,Cl– phenyl | $C_{10}H_7Cl_2N_3O_3$ | 288.09 | 156 | 77 | 41.69 | 2.45 | 14.59 | 41.78 | 2.56 | 14.46 |
| 72424 | H₃CO– (p) phenyl | $C_{11}H_{11}N_3O_4$ | 249.22 | 190 | 60+ | 53.01 | 4.45 | 16.86 | 53.00 | 4.43 | 16.76 |
| 72435 | H₃CO, H₃CO– phenyl | $C_{12}H_{13}N_3O_5$ | 279.25 | 176 | 84 | 51.61 | 4.69 | 15.05 | 51.80 | 4.69 | 14.88 |
| 72607 | H₃CO, H₃CO, H₃CO– phenyl | $C_{13}H_{15}N_3O_6$ | 309.27 | 206 | 57 | 50.48 | 4.89 | 13.59 | 50.28 | 4.97 | 13.58 |

*Yield calculated from removal of alcohol.

TABLE III

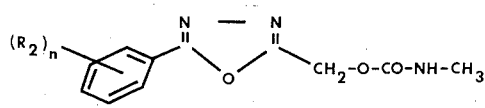

| Code No. | (R₂)ₙ― | Empirical formula | Molecular weight | Melting point (°C) | Yield (%) | Calculated (%) C | H | N | Found (%) C | H | N |
|---|---|---|---|---|---|---|---|---|---|---|---|
| 72674 | H₃C– (o) phenyl | $C_{12}H_{13}N_3O_3$ | 247.25 | 92 | 65 | 58.29 | 5.30 | 17.00 | 58.18 | 5.40 | 17.15 |
| 72392 | H₃C– (p) phenyl | $C_{12}H_{13}N_3O_3$ | 247.25 | 125 | 80 | 58.29 | 5.30 | 17.00 | 58.14 | 5.20 | 17.20 |
| 72443 | Cl– (p) phenyl | $C_{11}H_{10}ClN_3O_3$ | 267.67 | 136 | 70 | 49.36 | 3.77 | 15.70 | 49.52 | 3.87 | 15.80 |
| 72562 | F– (o) phenyl | $C_{11}H_{10}FN_3O_3$ | 251.21 | 106 | 81 | 52.59 | 4.01 | 16.73 | 52.49 | 4.20 | 16.84 |
| 72519 | F– (p) phenyl | $C_{11}H_{10}FN_3O_3$ | 251.21 | 108 | 75 | 52.59 | 4.01 | 16.73 | 52.67 | 4.05 | 16.54 |

TABLE III — Continued

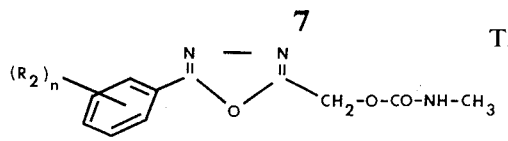

| Code No. | (R₂)ₙ ⌬ | Empirical formula | Molecular weight | Melting point (°C) | Yield (%) | Calculated (%) C | H | N | Found (%) C | H | N |
|---|---|---|---|---|---|---|---|---|---|---|---|
| 72371 | F₃C-⌬- | C₁₂H₁₀F₃N₃O₃ | 301.22 | 138 | 88 | 47.84 | 3.35 | 13.95 | 47.87 | 3.34 | 14.15 |
| 72372 | Cl,Cl-⌬- | C₁₁H₉Cl₂N₃O₃ | 302.12 | 141 | 68 | 43.73 | 3.00 | 13.91 | 43.53 | 2.93 | 13.78 |
| 72383 | H₃CO-⌬- | C₁₂H₁₃N₃O₄ | 263.25 | 106 | 70 | 54.75 | 4.98 | 15.96 | 54.55 | 4.94 | 16.03 |
| 72384 | H₃CO,H₃CO-⌬- | C₁₃H₁₅N₃O₅ | 293.27 | 116 | 87 | 53.24 | 5.16 | 14.33 | 53.28 | 5.14 | 14.19 |
| 72434 | H₃CO,H₃CO,H₃CO-⌬- | C₁₄H₁₇N₃O₆ | 323.30 | 125 | 95 | 52.01 | 5.30 | 13.00 | 51.98 | 5.34 | 13.03 |
| 730069 | ⌬-Cl | C₁₁H₁₀ClN₃O₃ | 267.67 | 82 | 59 | 49.36 | 3.77 | 15.70 | 49.39 | 3.65 | 15.82 |
| 730085 | ⌬-OCH₃ | C₁₂H₁₃N₃O₄ | 263.25 | 92 | 60 | 54.75 | 4.97 | 15.96 | 54.63 | 4.85 | 16.02 |

The compounds of formula (I) have been tested on animals in the laboratory and have been shown to possess analgesic, antiinflammatory, anticonvulsivant, tranquilising, myorelaxant, antidepressive, vasodilatatory, diuretic, anti-ulcerous, antiarythmic, antiserotoninic, spasmolytic, hypotensive, antibronchoconstrictive, anticholinergic and antiemetic properties.

1. Analgesic properties

The compounds of formula (I), administered by oral means to the mouse, are capable of reducing the number of painful stretchings caused by the intraperitoneal injection of acetic acid or phenylbenzoquinone.

By way of example, there are listed in the following Tables IV and V the percentage reduction in the number of painful stretchings following injection of acetic acid and phenylbenzoquinone, respectively, these percentages being obtained by administration of different compounds of formula (I).

TABLE IV

Painful stretchings caused by injection of acetic acid

| Code No of compound tested | Dose administered (mg/kg/p.o.) | Percentage reduction of number of painful stretchings |
|---|---|---|
| 71558 | 100 | 75 |
| 72357 | 100 | 60 |
| 72293 | 100 | 45 |
| 72130 | 100 | 47 |
| 72132 | 100 | 40 |
| 72329 | 50 | 50 |
| 72349 | 50 | 50 |
| 72220 | 100 | 50 |
| 72445 | 100 | 55 |
| 72435 | 100 | 50 |
| 72467 | 100 | 75 |
| 72468 | 100 | 80 |
| 72372 | 100 | 60 |
| 72392 | 100 | 45 |
| 72434 | 100 | 70 |
| 72443 | 100 | 60 |
| 72383 | 100 | 45 |
| 72519 | 100 | 50 |
| 72527 | 100 | 50 |

TABLE V

Painful stretchings caused by injection of phenylbenzoquinone

| Code No. of compound tested | Dose administered (mg/kg/p.o.) | Percentage reduction of number of painful stretchings |
|---|---|---|
| 72293 | 100 | 80 |
| 72329 | 50 | 100 |

2. Antiinflammatory properties

These properties are shown by a diminution of the local oedema caused by the sub-plantar injection of a phlogogenic agent, such as carraghenin, in the rat following the oral administration of compounds of formula (I).

By way of example, the results obtained by administration of different compounds of formula (I), are listed in the following Table VI.

TABLE IV

| Code NO. of compound tested | Dose administered (mg/kg/p.o) | Percentage reduction of oedema |
|---|---|---|
| 71558 | 100 | 33 |
| 72357 | 100 | 40 |
| 72403 | 100 | 33 |
| 72293 | 100 | 26 |
| 72130 | 100 | 40 |
| 72132 | 100 | 40 |
| 72329 | 20 | 32 |
| 72415 | 100 | 55 |
| 72460 | 100 | 55 |
| 72349 | 100 | 50 |
| 7209 | 50 | 30 |
| 72410 | 100 | 37 |
| 72220 | 100 | 60 |
| 72445 | 100 | 65 |
| 72435 | 100 | 50 |
| 72467 | 70 | 100 |
| 72468 | 100 | 55 |
| 71574 | 100 | 65 |
| 72371 | 100 | 40 |
| 72372 | 100 | 55 |
| 72392 | 100 | 25 |
| 72443 | 100 | 60 |
| 72384 | 100 | 30 |

TABLE IV-continued

| Code NO. of compound tested | Dose administered (mg/kg/p.o) | Percentage reduction of oedema |
| --- | --- | --- |
| 72519 | 100 | 30 |
| 72607 | 100 | 55 |
| 72562 | 100 | 80 |

3. Anticonvulsivant, tranquilising and myorelaxant properties.

The compounds of formula (I), preventively administered by oral means to the mouse, reduce the mortality provoked by the sub-cutaneous injection of cardiazol and strychnine.

The following Table VII gives, by way of example, the results obtained by administration of different compounds of formula (I).

TABLE VII

| Code No. of compound tested | Dose administered (mg/kg/p.o.) | Protection against lethality of | Percentage protection |
| --- | --- | --- | --- |
| 72293 | 45 | strychnine | 50 |
| 72329 | 60 | " | 50 |
| 72410 | 100 | " | 80 |
| 72519 | 100 | " | 90 |
| 72220 | 100 | cardiazol | 30 |
| 72445 | 100 | " | 40 |
| 72527 | 100 | " | 55 |
| 72371 | 100 | " | 40 |
| 72372 | 100 | " | 50 |
| 72443 | 100 | " | 40 |
| 72383 | 100 | " | 40 |

4. Hypotensive properties

Administered by intraveinous means to the anaesthetised rat, the compounds of formula (I) cause a lowering of the arterial pressure.

The activity of compounds of formula (I) in this domain, may be appreciated by referring to the following Table VIII, which set forth the results obtained by the administration of different compounds of formula (I).

TABLE VIII

| Code No. of compound tested | Dose administered (mg/kg/i.v) | Percentage reduction of arterial pressure | Duration of effect (mn) |
| --- | --- | --- | --- |
| 72357 | 1 | ≅20 | >25 |
| 72403 | 1 | ≅40 | >25 |
| 72415 | 0.5 | ≅50 | ≥30 |
| 72424 | 1 | ≅40 | ≥25 |
| 72527 | 1 | ≅35 | 30 |
| 72371 | 1 | ≅45 | ≥50 |
| 72443 | 1 | ≅75 | 30 |

5. Antibronchoconstrictive and anticholinergic properties

Injected by intraveinous or intraduodenal means, the compounds of formula (I) are capable of opposing the bronchoconstriction provoked in the guinea-pig by the intraveinous injection of acetylcholine and evaluated by the Konzett method.

By way of example, the results obtained by administration of different compounds of formula (I) are listed in the following Table IX.

TABLE IX

| Code No. of compound tested | Dose administered | Percentage inhibition of bronchoconstriction |
| --- | --- | --- |
| 72357 | 1 mg/kg/i.v. | 100 |
| 72403 | 100 mg/kg/i.d. | 50 |
| 72293 | 100 mg/kg/i.d. | 50 |
| 72130 | 100 mg/kg/i.d. | 60 |
| 72349 | 100 mg/kg/i.d. | 50 |
| 72424 | 100 mg/kg/i.d. | 100 |
| 72445 | 100 mg/kg/i.d. | 50 |
| 71574 | 2 mg/kg/i.v. | 50 |
| 72372 | 100 mg/kg/i.d. | 50 |
| 72434 | 100 mg/kg/i.d. | 70 |
| 72443 | 100 mg/kg/i.d. | 50 |
| 72674 | 100 mg/kg/i.d. | 50 |
| 72607 | 100 mg/kg/i.d. | 50 |
| 72562 | 100 mg/kg/i.d. | 100 |

6. Antidepressive properties

The compounds of formula (I), preventively administered by oral means to the mouse, are capable of opposing the ptosis provoked by the injection of reserpine.

By way of example, the administration of 100 mg/kg/p.o. of the compound of code No. 72293 produced a reduction of 45% in the ptosis provoked by reserpine on the mouse.

7. Vasodilatatory properties

The compounds of formula (I) are capable of augmenting the flow of the coronary vessels of the isolated heart of a guinea-pig, when said compounds are added in the perfusion liquid of said organ.

By way of example, there is listed in the following Table X, the results obtained by the administration of different compounds of formula (I).

TABLE X

| Code No. of compound tested | Concentration in perfusion liquid (µg/ml) | Percentage augmentation of flow of heart |
| --- | --- | --- |
| 72293 | 0,1 | 40 |
| 72115 | 0,1 | 55 |
| 72329 | 0,5 | 65 |
| 72349 | 0,1 | 160 |
| 7209 | 1 | 70 |
| 72424 | 0,5 | 30 |
| 72220 | 0,25 | 30 |
| 72435 | 0,5 | 35 |
| 72371 | 1 | 40 |
| 72434 | 0,5 | 40 |
| 72383 | 0,5 | 25 |

8. Diuretic properties

The compounds of formula (I), administered by oral means to the mouse, simultaneously with a volume of 1 ml. of an isotonic solution of sodium chloride per 25 g of the corporeal weight of the mouse, are capable of provoking an augmentation of the volume of urine emitted by reference to control animals, the volume being measured for 4 hours following administration.

By way of example, the following Table XI lists the results obtained by the administration of 25 mg/kg/P.O. of different compounds of formula (I).

TABLE XI

| Code No. of compound tested | Percentage augmentation of urinary elimination |
| --- | --- |
| 72132 | 70 |
| 72349 | 40 |
| 72410 | 40 |
| 72527 | 70 |
| 72371 | 90 |
| 72434 | 80 |

TABLE XI-continued

| Code No. of compound tested | Percentage augmentation of urinary elimination |
|---|---|
| 72384 | 85 |

9. Anti-ulcerous properties

The compounds of formula (I) administered by intraduodenal means reduce the extent of gastric ulcers, provoked in a rat by tying of the pylorus (Shay ulcers).

By way of example, there is listed in the following Table XII, the percentages of reduction of the Shay ulcers obtained by administration of 50 mg/kg/i.d. of different compounds of formula (I).

TABLE XII

| Code No. of compound tested | Percentage reduction of ulcers |
|---|---|
| 72329 | 50 |
| 72349 | 50 |
| 72445 | 35 |
| 72467 | 30 |
| 72383 | 35 |
| 72384 | 33 |

10. Anti-arythmic properties

Administered by intraperitoneal means, the compounds of formula (I) are capable of protecting the mouse against the ventricular fibrillations provoked by the inhalation of chloroform.

By way of example, there is specified in the following Table XIII the DE 50 of different compounds of formula (I).

TABLE XIII

| Code no. of compound tested | D.E. 50 (mg/kg/i.p) |
|---|---|
| 72415 | 150 |
| 72460 | 145 |
| 72410 | 160 |
| 72516 | 145 |

11. Antiserotoninic properties

The compounds of formula (I), administered by intraveinous means, are capable of opposing the bronchoconstrictural effects of the intraveinous injection of serotonine, these effects being evaluated by the Konzett and Rossler tests, on the guinea-pig.

By way of example, the administration of 1 mg/kg/i.v of the compound of code No. 72516 permits a reduction of 100% on the bronchoconstrictural effects of serotonine.

12. Spasmolytic properties

The compounds of formula (I), introduced in the conserving medium are capable of opposing the contractural action of barium chloride on the isolated duodenum of the rat. This activity is evaluated by taking papaverine as standard.

By way of example, the compound of code No. 72443 presents an equivalent activity to that of papaverine.

13. Antiemetic properties

The compounds of formula (I), administered by oral means, permits a reduction in the vomitings provoked by apomorphine in the dog.

By way of example, the administration of 10 mg/Kg/p.o. of the compounds of code nos. 72132 and 72329 permits a 50% reduction in the vomitings caused by apomorphine.

As a result of a comparison between the pharmacologically active doses mentioned above and the lethal doses listed in the following Table XIV, the difference between said doses is sufficiently great to permit the utilisation of the compounds of formula (I) in therapeutics.

TABLE XLV

| Code No. of compound listed | Dose administered (mg/KG/p.o.) to the mouse | Percentage mortality (%) |
|---|---|---|
| 71558 | 1 400 | ≅50 |
| 72357 | 1 600 | ≅50 |
| 72403 | 2 000 | ≅10 |
| 72293 | 2 200 | ≅50 |
| 72115 | 2 000 | 0 |
| 72130 | 2 200 | ≅50 |
| 72132 | 1 700 | ≅50 |
| 72329 | 1 200 | ≅50 |
| 72415 | 2 500 | ≅50 |
| 72460 | 2 000 | ≅10 |
| 72349 | 1 300 | ≅50 |
| 7209 | 3 000 | ≅50 |
| 72410 | 1 100 | ≅50 |
| 72424 | 2 000 | 0 |
| 72220 | 2 500 | ≅50 |
| 72445 | 2 200 | ≅50 |
| 72435 | 2 000 | 0 |
| 72467 | 2 000 | 0 |
| 72468 | 2 000 | 0 |
| 72516 | 2 000 | 0 |
| 72527 | 1 200 | ≅50 |
| 71574 | 2 100 | ≅50 |
| 72371 | 2 000 | 0 |
| 72372 | 1 600 | ≅50 |
| 72434 | 4 400 | ≅50 |
| 72443 | 1 100 | ≅50 |
| 72383 | 2 000 | 0 |
| 72384 | 1 800 | ≅50 |
| 72519 | 1 500 | ≅50 |
| 72674 | 2 000 | 0 |
| 72607 | 2 000 | 0 |
| 72562 | 1 850 | ≅50 |

The compounds of formula (I) are useful in the treatment of diverse originating pains, painful inflaminations, hypertensions, epilepsy, anxiety, contractures, asthma, visceral spasms, gastroduodenal ulcers, depressions, circulatory insufficiencies, oedemas, cardiac arythmies and migraines.

They may be administered by oral means — in the form of tablets, gelules and dragees containing 25 to 400 mg of active ingredient (1 to 5 times a day), in the form of drinkable drops in doses of 0.2 to 2% (30 to 100, three times a day) and in the form of syrup in a dose of 0.2 to 2% (3 to 6 spoonfuls a day), by parenteral means in the form of injectable ampoules containing 1 to 150 mg of active ingredient (1 or 2 per day) and by rectal means in the form of suppositories containing 25 to 400 mg of active ingredient (1 or 2 times a day).

Accordingly, the present invention also relates to a therapeutic composition comprising a compound of the general formula (I) together with a therapeutically-acceptable carrier.

What we claim is:

1. A compound of the formula:

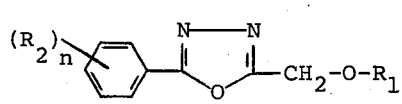

wherein:

R$_1$ is hydrogen, aminocarbonyl or aminocarbonyl N-substituted by alkyl having up to 4 carbon atoms, R$_2$ is halogen, alkoxy having up to 4 carbon atoms, alkyl having up to 4 carbon atoms, or trifluoromethyl, and $n$ is 0, 1, 2 or 3.

2. A compound of claim 1, in which R$_1$ is hydrogen.

3. A compound of claim 1, in which R$_1$ is aminocarbonyl.

4. A compound of claim 1, in which R$_1$ is N-methyl aminocarbonyl.

5. A compound of claim 2, in which R$_2$ is chloro or fluoro.

6. A compound of claim 2, in which R$_2$ is methyl.

7. A compound of claim 2, in which R$_2$ is methoxy.

8. A compound of claim 5 in which $n$ is 2 or 3.

9. A compound of claim 3, in which R$_2$ is chloro or fluoro.

10. A compound of claim 4, in which R$_2$ is chloro or fluoro.

11. A compound of claim 3, in which R$_2$ is methyl.

12. A compound of claim 4, in which R$_2$ is methyl.

13. A compound of claim 3, in which R$_2$ is methoxy.

14. A compound of claim 4, in which R$_2$ is methoxy.

15. A compound of claim 9 in which n is 2 or 3.

16. A compound of claim 10 in which $n$ is 2 or 3.

17. A compound of claim 7 in which $n$ is 2 or 3.

18. A compound of claim 13 in which $n$ is 2 or 3.

19. A compound of claim 14 in which $n$ is 2 or 3.

* * * * *